US006189849B1

(12) United States Patent
Sweere et al.

(10) Patent No.: US 6,189,849 B1
(45) Date of Patent: Feb. 20, 2001

(54) LIFT SYSTEM

(75) Inventors: Harry C. Sweere, Minneapolis; Matthew J. Showalter, St. Paul, both of MN (US)

(73) Assignee: Ergotron, Inc., Eagan, MN (US)

( * ) Notice: Under 35 U.S.C. 154(b), the term of this patent shall be extended for 0 days.

(21) Appl. No.: 09/073,655

(22) Filed: May 6, 1998

(51) Int. Cl.[7] .................................................. E04G 3/00
(52) U.S. Cl. .................... 248/286.1; 248/295.11
(58) Field of Search .................... 248/918, 917, 248/920, 291.1, 295.11, 286.1, 276.1

(56) References Cited

U.S. PATENT DOCUMENTS

| 4,215,776 | * | 8/1980 | Esler ................................. 198/823 |
| 4,357,249 | * | 11/1982 | Mellor ................................ 252/12 |
| 4,691,886 | * | 9/1987 | Wendling et al. .................. 248/920 |
| 4,856,740 | * | 8/1989 | MacLeod et al. ................ 248/286.1 |
| 5,160,104 | * | 11/1992 | Sher .................................. 248/295.11 |
| 5,487,525 | * | 1/1996 | Drabczyk et al. .................. 248/918 |
| 5,626,323 | * | 5/1997 | Lechman et al. ................. 248/291.1 |
| 5,738,316 | * | 4/1998 | Sweere et al. ..................... 248/920 |
| 5,836,562 | * | 11/1998 | Danzyger et al. ............. 248/295.11 |
| 5,860,370 | * | 1/1999 | Poniecki ......................... 248/295.11 |
| 5,881,984 | * | 3/1999 | Lin .................................. 248/286.1 |

* cited by examiner

*Primary Examiner*—Anita M. King
*Assistant Examiner*—Gwendolyn Baxter
(74) *Attorney, Agent, or Firm*—Schwegman, Lundberg, Woessner & Kluth, P.A.

(57) ABSTRACT

Low side profile flat panel monitor/keyboard lift system for the storage of and the display of a flat panel monitor and keyboard in space restricted rooms or passageways. The flat panel monitor and keyboard tray are mounted in common to a vertically aligned transport assembly which is influenced by a linkage assembly.

24 Claims, 12 Drawing Sheets

LIFT SYSTEM

CROSS REFERENCES TO CO-PENDING APPLICATIONS

None.

BACKGROUND OF THE INVENTION

1. Field of the Invention

The present invention is for a system for storage and use of a monitor and/or keyboard, and more particularly, pertains to a flat panel monitor/keyboard lift system which is vertically adjustable and which stores in a minimum profile.

2. Description of the Prior Art

Prior art devices have provided for the storage and display of monitors and keyboards but few have addressed providing vertically adjustable and low profile systems for use in space restricted areas or passageways such as areas where egress from such an area could be hampered by storage and display mechanisms due to a wide profile.

The present invention provides a flat panel monitor/keyboard lift system which is vertically adjustable and which stores in a minimum profile.

SUMMARY OF THE INVENTION

The present invention is a flat panel monitor/keyboard lift system which is vertically adjustable and which stores in a minimum profile. The flat panel monitor/keyboard lift system preferably is mounted to a wall, but can be mounted to other surfaces or supports.

According to one or more embodiments of the present invention, there is provided a transport assembly secured to a support panel which provides for simultaneous vertical positioning of a flat panel monitor and/or a keyboard. The transport assembly includes opposing extendable rails which align vertically and which extend vertically to adjust the height of the keyboard and/or flat panel monitor, with respect to the support panel, to that height desired by the user. A monitor mounting channel bridges the upper-mid portions of the extendable rails and includes a pivot mount for adjustable mounting of a flat panel display. A keyboard mounting channel bridges the lower regions of the extendable rails and includes a pivot mount and connected keyboard tray for mounting of a keyboard. The keyboard mounting channel pivot mount can be mounted in a plurality of holes in the keyboard mounting channel for vertical adjustment of the keyboard tray and mounted keyboard with respect to the flat panel display secured to the pivot mount on the monitor mounting channel. Vertical adjustment of the monitor mounting channel results in a corresponding vertical movement of the keyboard mounting channel as they are both mounted in common to the extendable rails. The keyboard tray pivots about the pivot mount on the keyboard mounting channel to position the keyboard to a minimum stowed profile.

A linkage assembly secures on one end to the support panel and the other end slideably engages an abutment assembly including a triangular plate and a wear bar which is connected to one of the extendable rails and to the monitor mounting channel. The linkage assembly, which includes a gas spring, provides for vertical support of the transport assembly which includes the extendable rails, the monitor mounting channel, the monitor mounting channel pivot mount, the abutment assembly, the keyboard mounting channel, the keyboard mounting channel pivot mount, a keyboard tray, and other associated components. An adjuster provides for adjustment of the gas spring of the linkage assembly and also provides for assisted positioning of the transport assembly and its payload.

One alternative embodiment of the vertical lift system includes a shortened support panel and shortened left and right extendable rails where structure for support of a flat panel monitor is needed but where keyboard support is not required.

Another alternative embodiment discloses a vertical lift system for support of a keyboard where support of a flat panel monitor is not required.

One significant aspect and feature of the present invention is a flat panel monitor/keyboard lift system having a minimum profile.

Another significant aspect and feature of the present invention is a flat panel monitor/keyboard lift system suitable for use in space restricted areas, passages or hallways or other areas where egress or passage shall not be hampered.

Another significant aspect and feature of the present invention is a flat panel monitor/keyboard lift system having vertically positionable components where such components are those of a transport assembly.

Another significant aspect and feature of the present invention is a flat panel monitor/keyboard lift system having a pivot mount for a flat panel display.

Another significant aspect and feature of the present invention is a flat panel monitor/keyboard lift system having a pivot mount for a keyboard tray and keyboard.

Another significant aspect and feature of the present invention is a flat panel monitor/keyboard lift system having a transport assembly where a monitor mounting channel and a keyboard mounting channel bridge opposing positionable rails.

Another significant aspect and feature of the present invention is a flat panel monitor/keyboard lift system having a transport assembly where a monitor mounting channel and a keyboard mounting channel are supported by a linkage assembly.

Another significant aspect and feature of the present invention is a flat panel monitor/keyboard lift system having a transport assembly which can be field adjusted to provide linear counterbalanced support over a range of payloads.

Another significant aspect and feature of the present invention is a flat panel monitor lift system for adjustable support of a flat panel monitor solely.

Another significant aspect and feature of the present invention is a keyboard lift system for adjustable support of a keyboard solely.

Another significant aspect and feature of the present invention is a flat panel monitor/keyboard lift system having a locking mechanism for vertical locking of the transport assembly where such locking is urged by positioning of the keyboard tray and/or by manual inputs to the keyboard.

Having thus described embodiments of the present invention, it is the principal object hereof to provide a flat panel monitor/keyboard lift system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
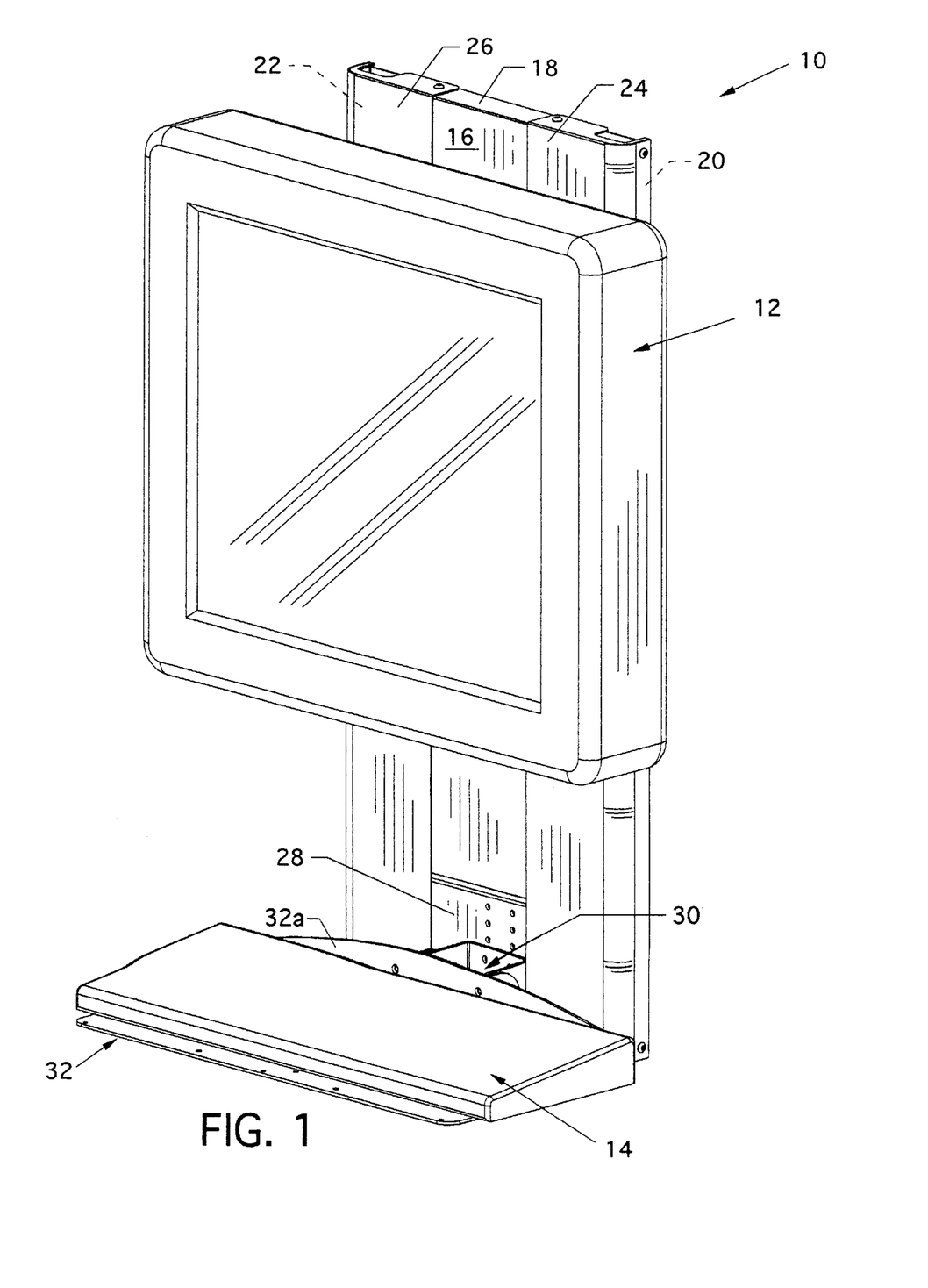
FIG. 1 illustrates an isometric view of a flat panel monitor/keyboard lift system having a monitor or flat panel display and a keyboard attached thereto.

FIG. 1 illustrates an isometric view of a flat panel monitor/keyboard lift system, herein known as the vertical lift system 10, having a monitor 12, or flat panel display, and a keyboard 14 (shown generically as a block) attached thereto. Components fully or partially visible in the illustration include a vertically oriented planar support panel 16, a horizontally oriented planar top 18 extending at a right angle from the upper region of the planar support panel 16, a vertically oriented right planar panel side 20 (shown in FIG. 3) extending at a right angle from the right region of the rear planar support panel 16, a vertically oriented left planar panel side 22 (shown in FIG. 3) extending at a right angle from the left region of the planar support panel 16, a vertically oriented right cover 24 secured at the top to the planar top 18 and at the bottom to a horizontally aligned planar bottom 19 (shown in FIG. 4) and extending downwardly over and about and attached to the right planar panel side 20, a vertically oriented left cover 26 secured at the top to the planar top 18 and at the bottom to the horizontally aligned planar bottom 19 (shown in FIG. 4) and extending downwardly over and about and attached to the left planar panel side 22, a vertically positionable keyboard mounting channel 28, a pivot mount 30 secured to the keyboard mounting channel 28, and a keyboard tray 32 attached to the keyboard mounting channel 28 via the pivot mount 30.

Figure 2:
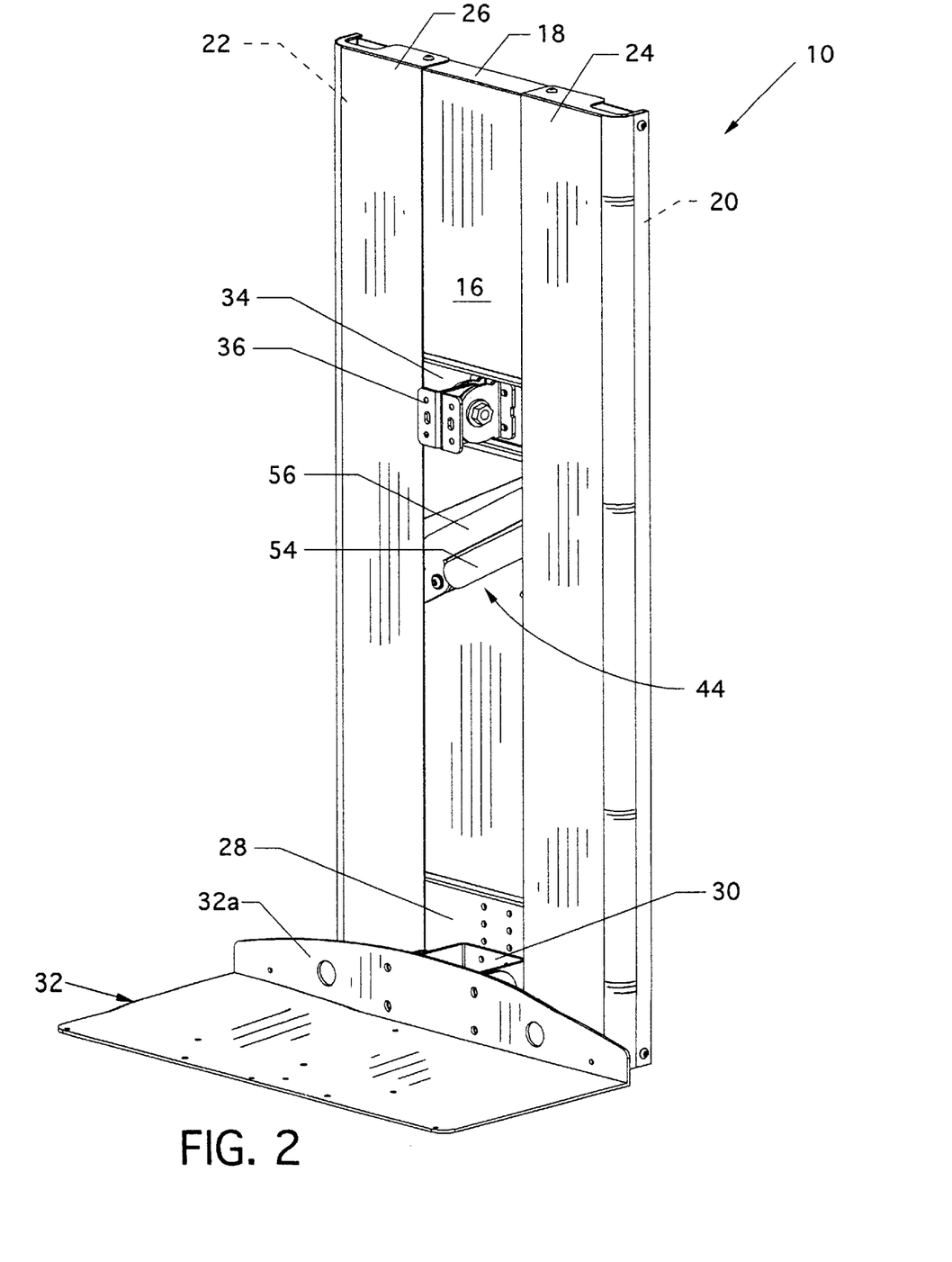
FIG. 2 illustrates the lift system with the monitor and the keyboard not shown.

FIG. 2 illustrates the lift system 10, where all numerals correspond to those elements previously or otherwise described. The monitor 12 and the keyboard 14 are not shown, thereby showing the lift system 10 prior to mounting of a monitor or keyboard, such as shown in FIG. 1. Revealed in FIG. 2 is a positionable monitor mounting channel 34 and a pivot mount 36 secured thereto. The pivot mount 36 accommodates a monitor or flat panel display, shown previously. The monitor mounting channel 34 is connected for movement with the keyboard mounting channel 28, as later described in detail.

Figure 3:
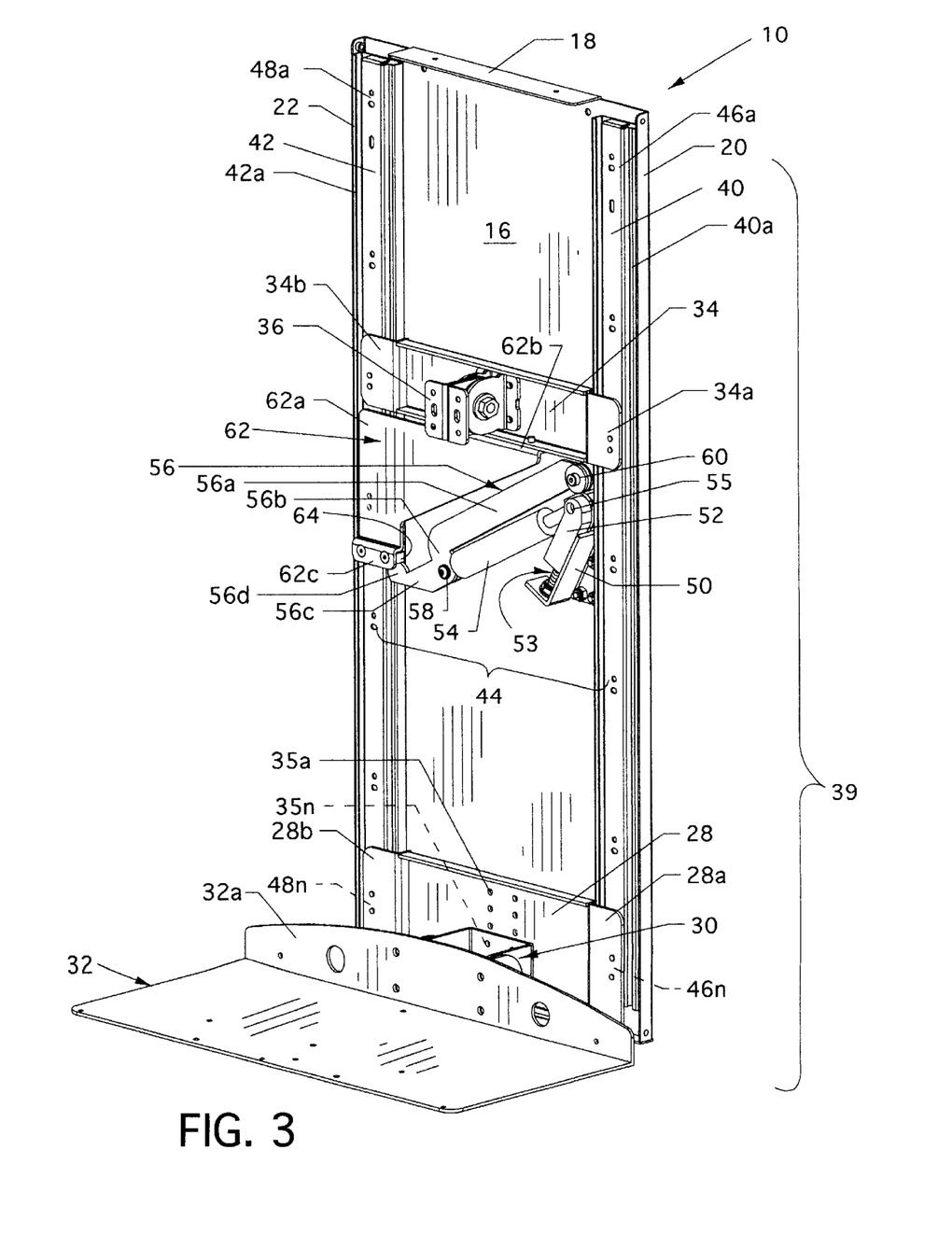
FIG. 3 illustrates the lift system having right and left covers removed to reveal a transport assembly.

FIG. 3 illustrates the lift system 10 having right and left covers 24 and 26 removed, where all numerals correspond to those elements previously or otherwise described. Removal of the right and left covers 24 and 26 reveals a transport assembly 39 including opposing vertically aligned extendable rails 40 and 42 slideable in respective extender channels 40a and 42a secured to the planar support panel 16 in positions adjacent to the right and left planar panel sides 20 and 22, respectively, the monitor mounting channel 34, and the keyboard mounting channel 28. The monitor mounting channel 34 and the keyboard mounting channel 28 are suspended between the extendable rails 40 and 42. The monitor mounting channel 34, to which the pivot mount 36 is secured, includes a right tab 34a appropriately secured to the upper-mid portion of the extendable rail 40 and a left tab 34b appropriately secured to the upper-mid portion of the extendable rail 42. In a somewhat similar fashion, the keyboard mounting channel 28, to which the pivot mount 30 is secured, includes a right tab 28a appropriately secured to the lower portion of the extendable rail 40 and a left tab 28b appropriately secured to the lower portion of the extendable rail 42. The monitor mounting channel 34, being mounted on the extendable rails 40 and 42 above the keyboard mounting channel 28, and the keyboard mounting channel 28, being mounted at the lower region of the extendable rails 40 and 42, are spaced at a suitable distance to provide optimum spacing between a monitor and a keyboard mounted to the appropriate members of the transport assembly 39. Macro spacing between the keyboard mounting channel 28 and the monitor mounting channel 34, which are secured in common to the extendable rails 40 and 42, is provided by securing the keyboard mounting channel 28 and the monitor mounting channel 34 to appropriate pluralities of hole sets 46a–46n and 48a–48n located along the extendable rails 40 and 42. Micro adjustment between the keyboard mounting channel 28 and the monitor mounting channel 34 is accomplished by utilization of a plurality of hole sets 35a–35n located central to the keyboard mounting channel 28 which accommodate the pivot mount 30, which can be secured to any of the hole sets 35a–35n.

Means composed of a linkage assembly 44 is utilized to provide supported vertical linear motion and positioning of the transport assembly 39 with respect to the planar support panel 16. The linkage assembly 44 secures to the planar support panel 16 in close proximity to the extendable rail 40 and is aligned between the extendable rails 40 and 42. The linkage assembly 44 also aligns between the keyboard mounting channel 28 and the monitor mounting channel 34, and is parallel to the planar support panel 16. Included in the linkage assembly 44 is an angle bracket 50 secured to the planar support panel 16, a variable and adjustable length adjuster 52 secured to the angle bracket 50, and a gas spring 54 having one end pivotally secured by a pivot 55 to the adjustable end of the adjuster 52 and the other end pivotally secured near one end of an arm 56 by a pivot assembly 58. The central axis of the gas spring 54 is offset at an angle from the central axis of the arm 56. A pivot assembly 60 pivotally secures one end of the arm 56 to the planar support panel 16 at a point near the extendable rail 40. The arm 56 includes continuous sections 56a, 56b, 56c and a cam 56d. Arm section 56a, the longest of the continuous sections, has a short section 56b extending from one end at a right angle. Another section 56c extends from the short section 56b at a right angle. A cam 56d is located at one end of section 56c.

An abutment assembly which includes a substantially triangular plate 62 secures along a vertically oriented edge 62a to the extendable rail 42 and along an angled edge 62b to the lower side of the monitor mounting channel 34. The abutment assembly also includes a bracket 62c formed at the lower region of the triangular plate 62 and an ultra high molecular weight (UHMW) polyethylene wear bar 64 secured thereto to accommodate intimate sliding contact with the cam 56d of the arm 56.

Figure 4:
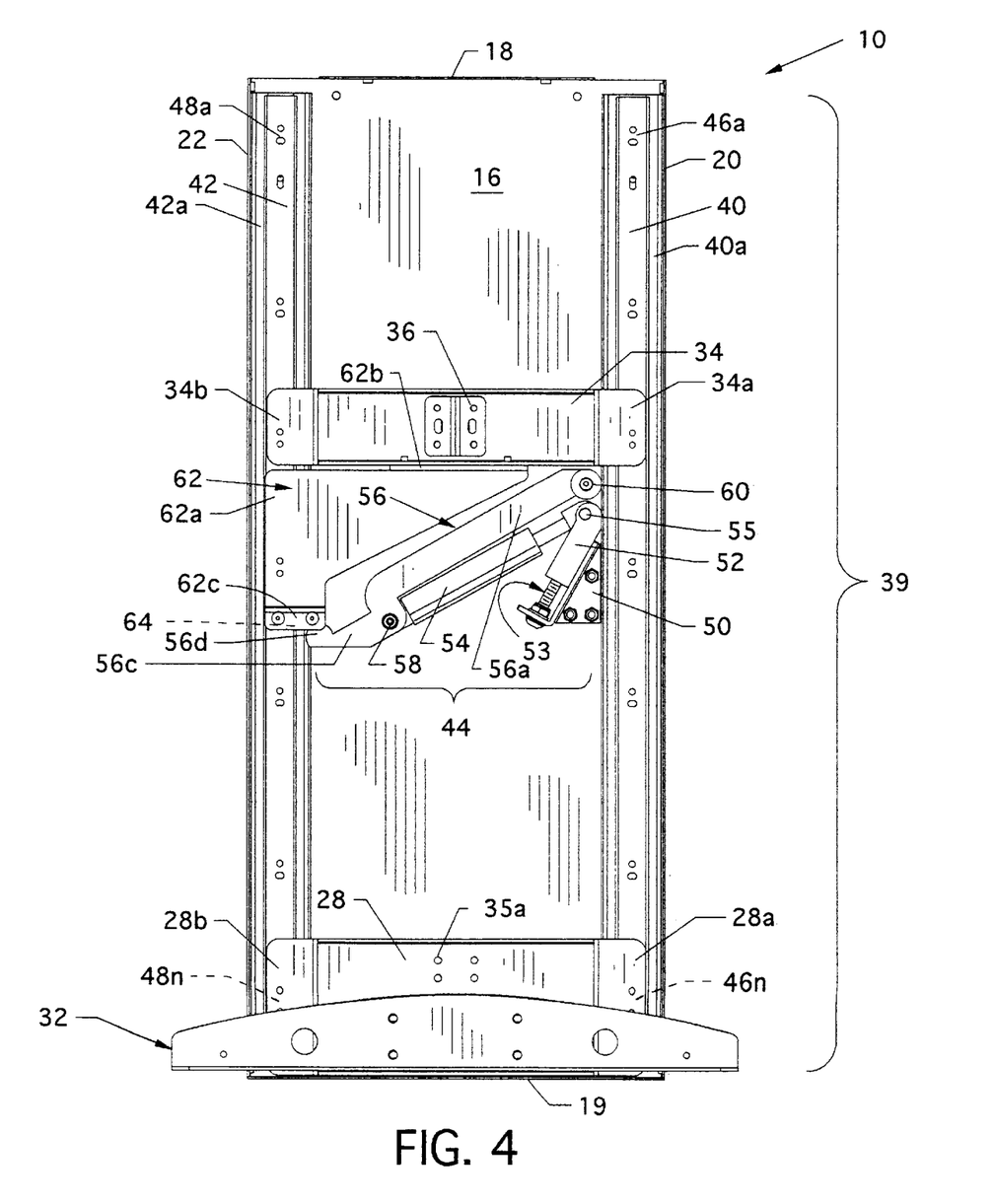
FIG. 4 illustrates a front view of the lift system of FIG. 3 showing the transport assembly positioned at its lowermost position.
Figure 5:
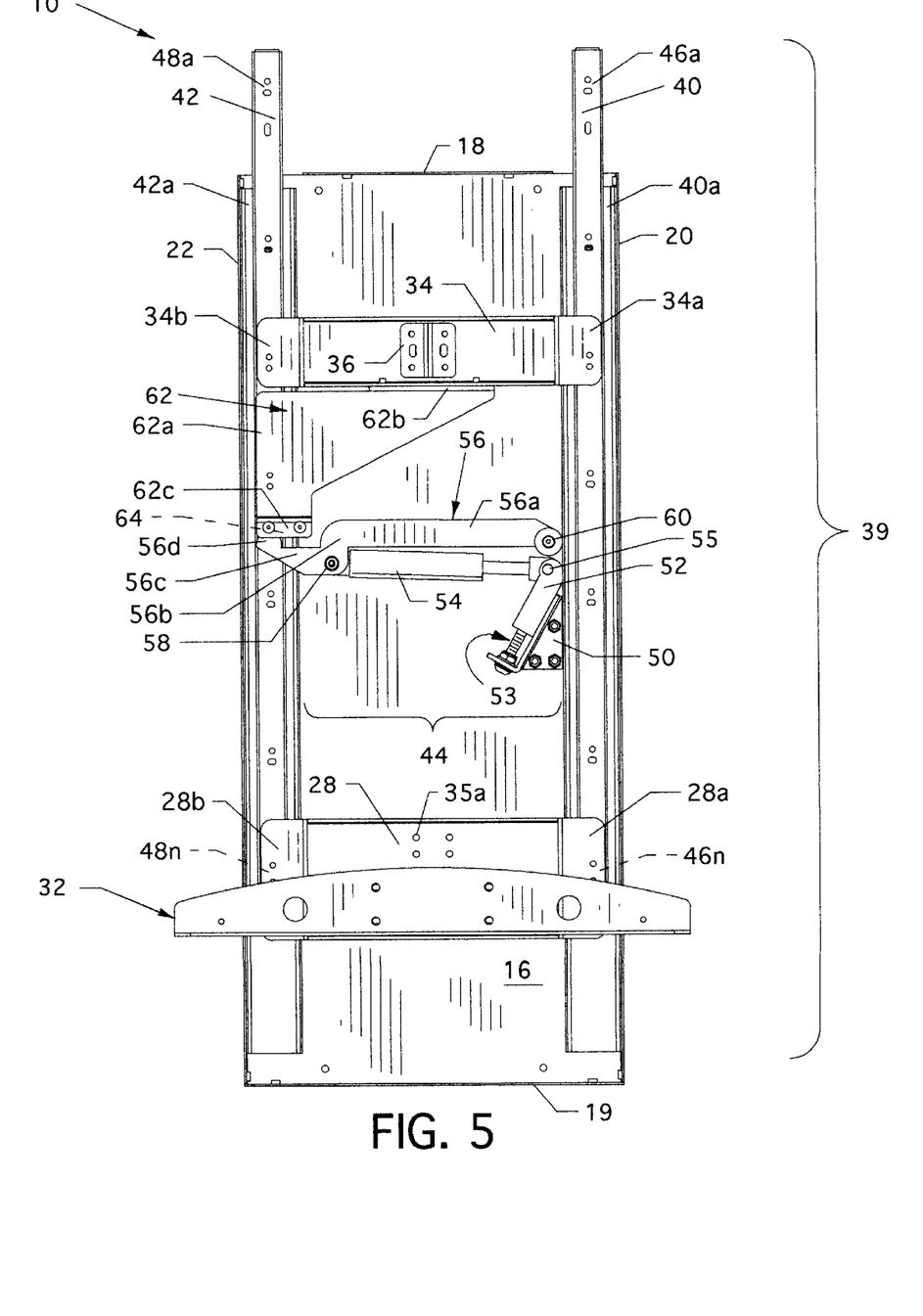
FIG. 5 illustrates a front view of the lift system of FIG. 3 showing the transport assembly positioned at a mid position.
Figure 6:
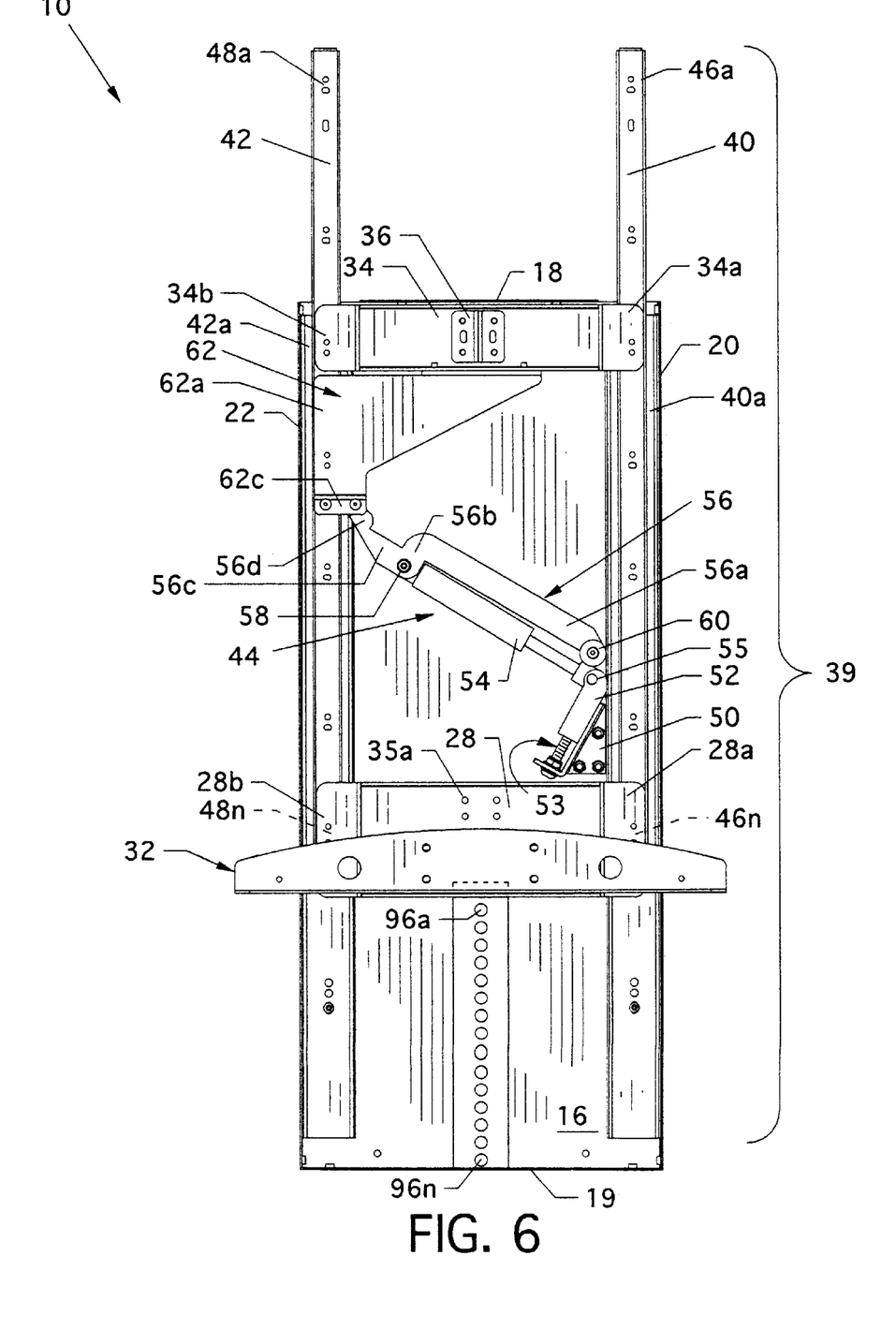
FIG. 6 illustrates a front view of the lift system of FIG. 3 showing the transport assembly positioned in the fully extended and upward position.

FIG. 4 illustrates a front view of the lift system 10 of FIG. 3 showing the transport assembly 39 positioned at its lowermost position, where all numerals correspond to those elements previously or otherwise described. The transport assembly 39 is free to move upwardly from the position shown, whereby the extendable rails 40 and 42 are free to slideably position upwardly in the extender channels 40a and 42a, as illustrated in FIGS. 5 and 6. As shown, the extendable rails 40 and 42 are fully retracted and limited in downward movement by stops internal to the extendable rails 40 and 42. Movement of the transport assembly 39 is initiated by grasping the flat panel display 12 or the keyboard tray 32 and then applying a slight upward pressure to cause upward movement of the components of the transport assembly 39 and the attached payload (flat panel display 12, keyboard 14) along the extender channels 40a and 42a. Vertical movement of the extendable rails 40 and 42 along the extender channels 40a and 42a is assisted by the linkage assembly 44. The angular relationship between pivot 55 and pivots in pivot assemblies 58 and 60 is determined by the adjuster 52. The angle of the angle bracket 50 is determined by computer algorithms to provide a linear counterbalance moving force over a range of transport assembly (39) payloads. Adjuster screw 53 is used to position the adjuster 52 along the angle bracket 50 to provide counterbalance for a given load. As the transport assembly 39 is positioned upwardly, the cam 56d maintains sliding contact with the wear bar 64 at the lower portion of the triangular plate 62 to support the transport assembly 39 and payload. Once a desired vertical height of the flat panel display 12 and keyboard 14 is achieved, the linkage assembly 44 provides sufficient force to maintain the transport assembly and payload at the desired height.

FIG. 5 illustrates a front view of the lift system 10 of FIG. 3 showing the transport assembly 39 positioned at a mid position, where all numerals correspond to those elements previously or otherwise described.

FIG. 6 illustrates a front view of the lift system 10 of FIG. 3 showing the transport assembly 39 positioned in the fully extended and upward position, where all numerals correspond to those elements previously or otherwise described. Support is provided by the linkage assembly 44 to maintain the monitor mounting channel 34 and keyboard tray, i.e., the transport assembly 39, in the upwardly extended position.

Figure 7:
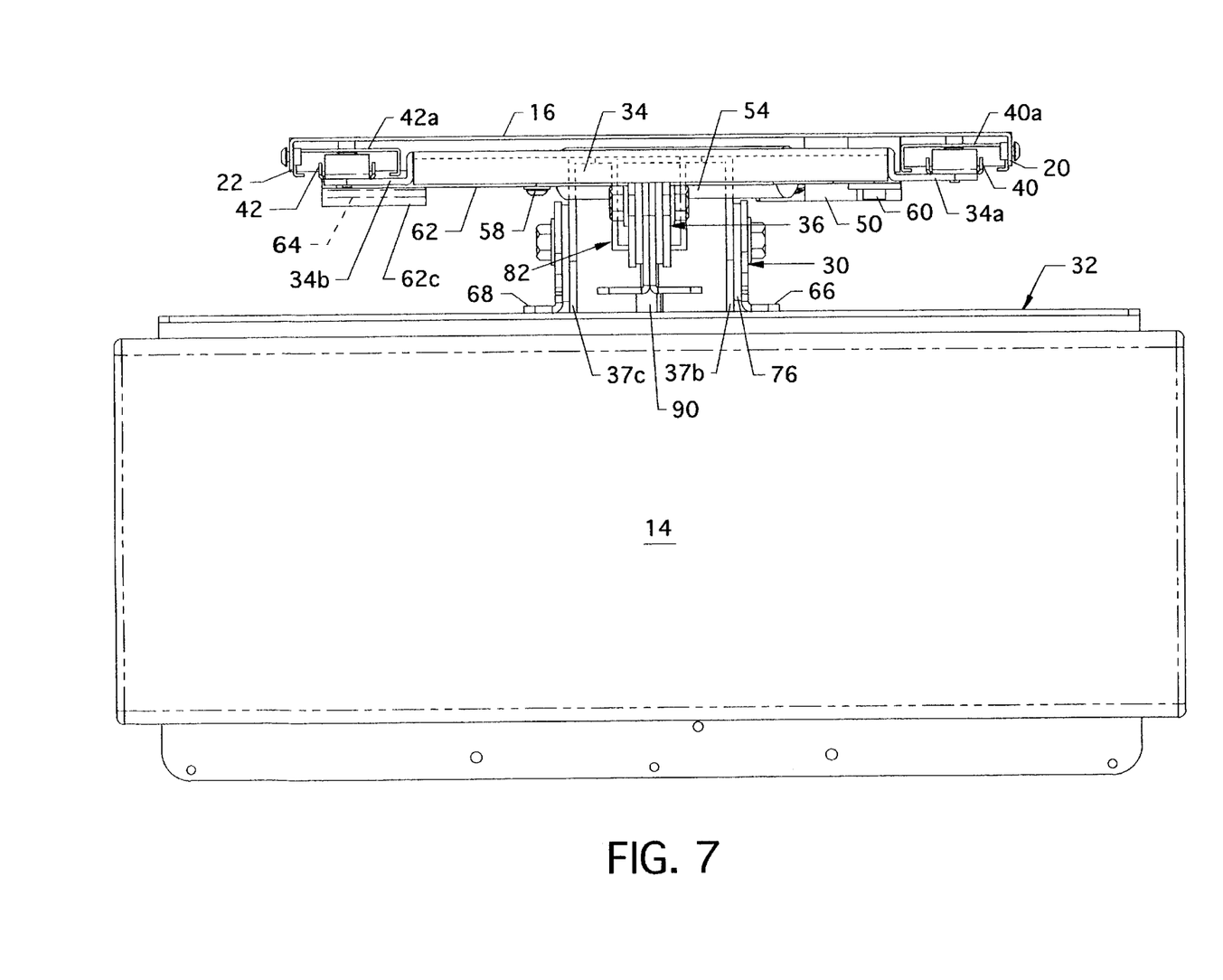
FIG. 7 illustrates a top view of the lift system.

FIG. 7 illustrates a top view of the lift system 10 of FIG. 4, where all numerals correspond to those elements previously or otherwise described. The planar top 18 is not shown for purpose of brevity and clarity.

Figure 8:
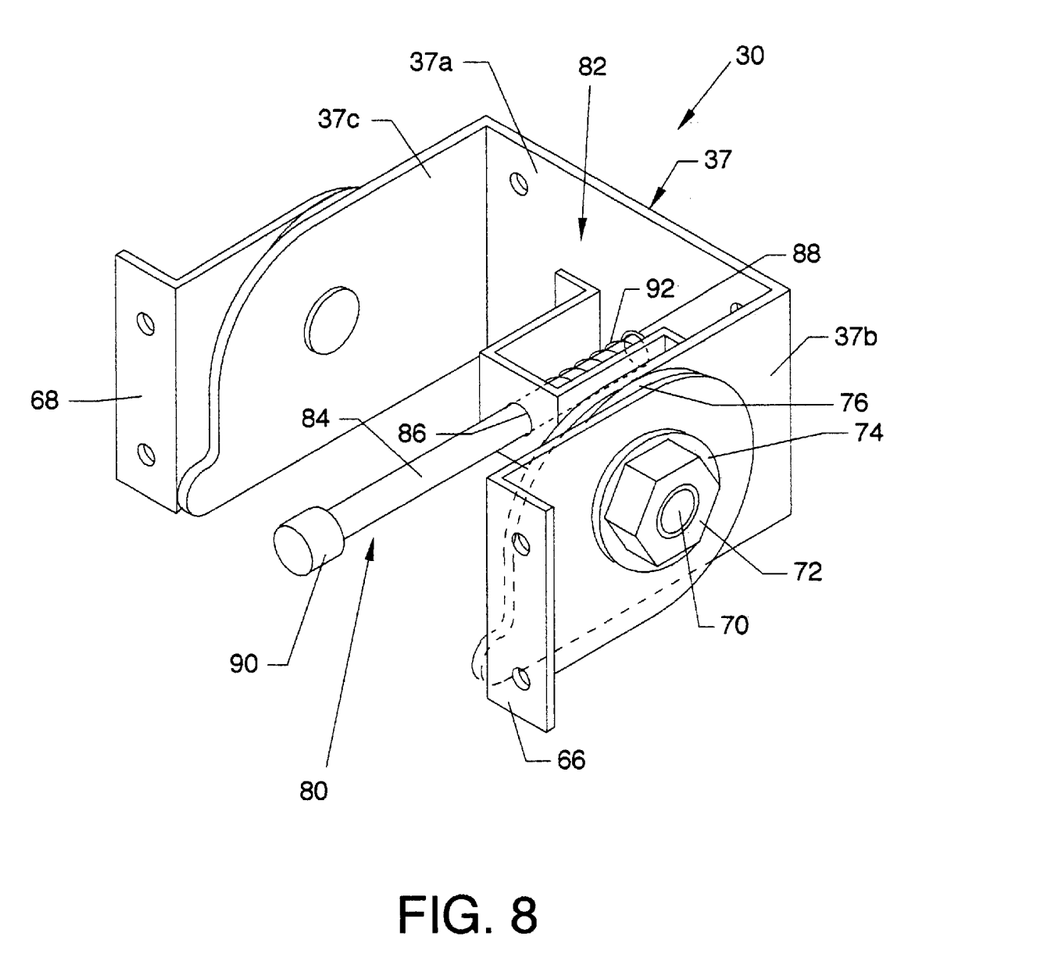
FIG. 8 illustrates an isometric view of the keyboard mounting channel pivot mount.

FIG. 8 illustrates an isometric view of the pivot mount 30, where all numerals correspond to those elements previously or otherwise described. The pivot mount 30 secures to the keyboard mounting channel 28 and is incorporated as an attachment point for the keyboard tray 32. The keyboard tray 32 and an attached keyboard can be pivoted about the horizontal axis of the pivot mount 30 for vertical and non-obtrusive storage of the keyboard when not in use. The pivot mount 30 is related to the subject matter of U.S. Pat. No. 4,453,687 assigned to Applicant. The pivot mount 30 is a pivot (tilt) friction control mechanism including frictional brake members having coefficients of static and dynamic friction that are substantially equal. Employing such material enables the user to initiate a forward or rearward adjustable tilting movement simply by grasping and moving the top or bottom of the monitor 12 inwardly or outwardly to the desired position. When forward or rearward pivot force ceases, the pivot mount resistably restrains the monitor in the desired position.

Figure 9:
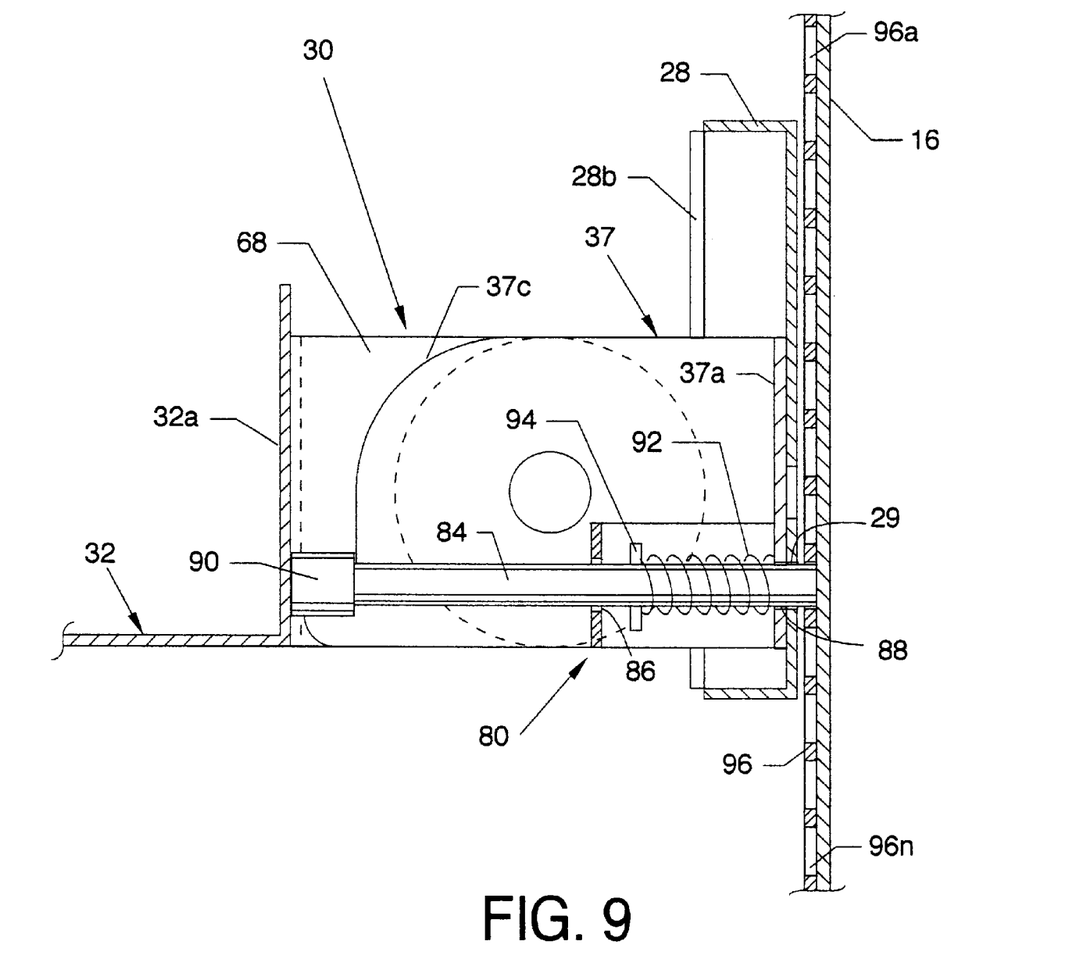
FIG. 9 illustrates a cross-sectional view of the pivot mount of FIG. 8 along with parts associated therewith.

The pivot mount 30 includes a U-shaped bracket 37 having a rear panel 37a and right and left panels 37b and 37c extending at right angles from the rear panel 37a. Right and left pivotable mounting brackets 66 and 68, respectively, are utilized for mounting of the keyboard tray 32. The right and left pivotable mounting brackets 66 and 68 are frictionally captured to the right and left panels 37b and 37c, respectively, of the U-shaped bracket 37. The right pivotable mounting bracket 66 secures to the right panel 37b by a stud 70, a nut 72, a spring washer 74, and a UHMW polyethylene washer 76 which serves in part as a frictional brake member. The left pivotable mounting bracket 68 secures to the left panel 37c in a similar fashion, but is not described in detail for the purpose of brevity. Also included in the pivot mount 30 is a locking mechanism 80 which can be incorporated to positively lock the transport assembly 39 in a vertical position should a keyboard operator engage in vigorous keyboard inputs. The locking mechanism 80 is self-locking and is automatically engaged when the keyboard tray 32 is deployed to a horizontal position for keyboard input, as described in relation to FIG. 9. Another U-shaped bracket 82 secures to the rear panel 37a and serves as a mount for a pushrod 84. The pushrod 84 aligns through a hole 86 in the bracket 82 as well as aligning with another hole 88 in the rear panel 37a of the U-shaped bracket 37. Thence, the pushrod 84 extends through a hole 29 in the keyboard mounting channel 28 to engage in one of a plurality of holes 96a–96n in a position locking bar 96 secured to the planar support panel 16, as shown in FIG. 9. A resilient rubber or plastic cap 90 is included at one end of the pushrod 84 for interaction with the vertical panel 32a of the keyboard tray 32, as shown in FIG. 9.

FIG. 9 is a cross sectional showing of the pivot mount 30 associated with the keyboard tray 32, the keyboard mounting channel 28, and a portion of the planar support panel 16, where all numerals correspond to those elements previously or otherwise described. A return spring 92 is captured on the pushrod 84 between the rear panel 37a of the U-shaped bracket 37 and a pin 94 through the pushrod 84. The weight of the keyboard tray 32 and keyboard pivot downwardly and about the pivotal axis of the pivot mount 30 until the vertical panel 32a contacts and forces the pushrod 84 rearwardly towards the planar support panel 16 for frictional engagement therewith. Vigorous keyboard input increases force applied to the pushrod, thereby increasing and/or sustaining additional locking force applied along the length of the pushrod 84, which is applied to the planar support panel 16. Frictional engagement can be in various forms. For example, frictional engagement can be simple force engagement of the pushrod to the surface of the planar support panel 16, or the near side of the planar support panel 16 can be coated with a suitable frictional surface such as, but not limited to, rubber, a gritty material, or some other geometrically configured attachment which would promote frictional engagement. Optionally shown in FIG. 9 is a plurality of holes 96a–96n in a position locking bar 96 secured to the planar support panel 16 which can be engaged by the pushrod 84.

Figure 10:
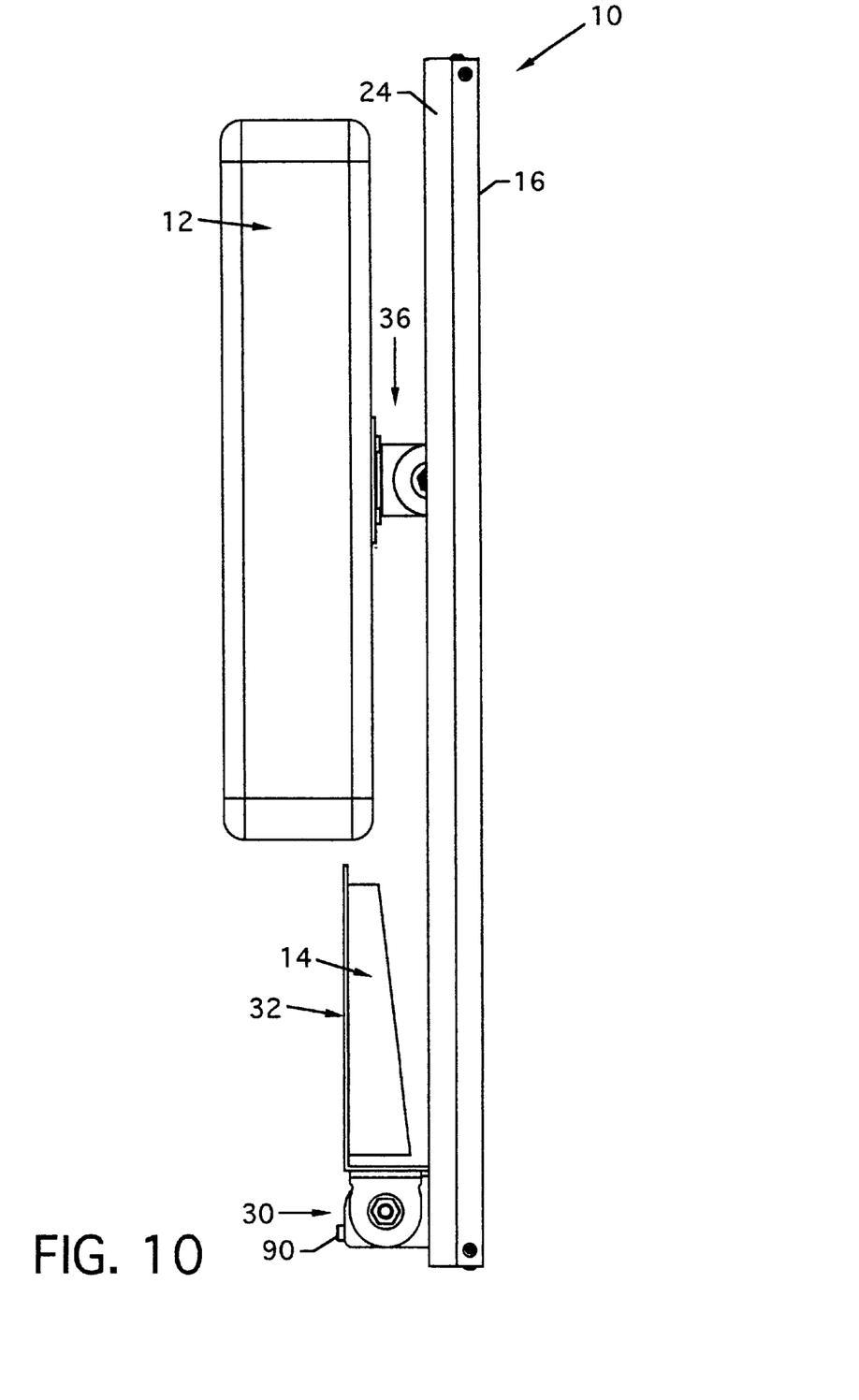
FIG. 10 illustrates side view of the flat panel monitor/keyboard lift system.

FIG. 10 illustrates a side view of the flat panel monitor/ keyboard lift system 10, where all numerals correspond to those elements previously or otherwise described, where the keyboard tray 32 is pivoted about the pivot mount 30 to the stowed position parallel to the planar support panel 16 to present a minimum horizontal profile.

Figure 11:
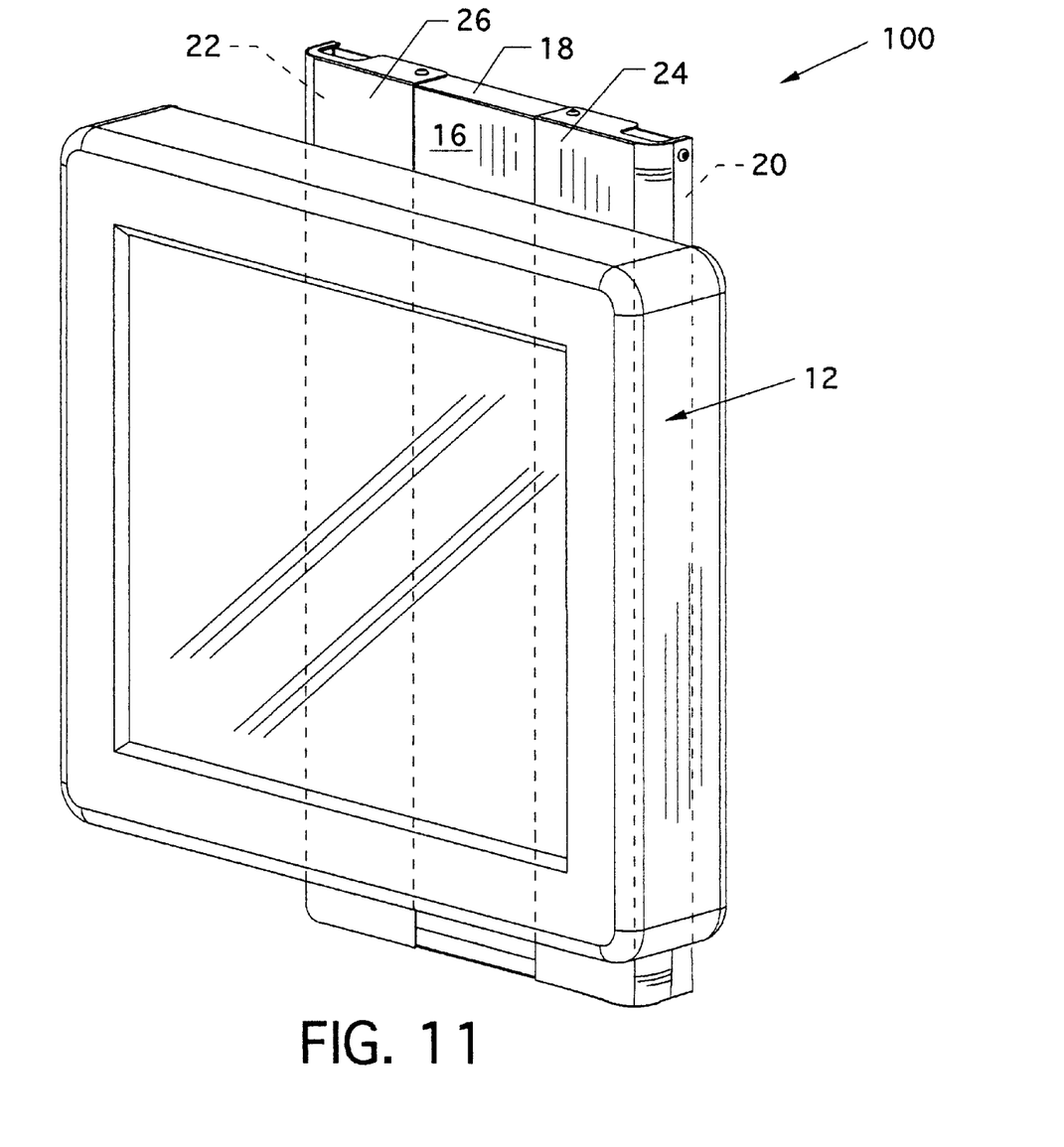
FIG. 11, a first alternative embodiment, illustrates an isometric view of a flat panel monitor lift system; and, FIG. 12, a second alternative embodiment, illustrates an isometric view of a keyboard lift system.

FIG. 11, a first alternative embodiment, illustrates an isometric view of a flat panel monitor lift system 100, where all numerals correspond to those elements previously and otherwise described. The flat panel monitor lift system 100 incorporates the elements previously described for the flat panel monitor/keyboard lift system 10, with the exception of those elements required for the mounting and operation of the keyboard tray 32, such as the keyboard mounting channel 28 and the pivot mount 30 and associated elements. Also, the planar support panel 16, left and right planar panel sides 22 and 20, the extendable rails 40 and 42, and the extender channels 40a and 42a, previously illustrated, may be shortened in the region below the two-bar linkage assembly 44, as their full length may not be required due to the absence of the keyboard tray 32, keyboard mounting channel 28, and the pivot mount 30 and associated elements. The vertical lift system 100 is utilized where a vertically positionable flat monitor is required for purpose of display without the use of a system mounted keyboard.

Figure 12:
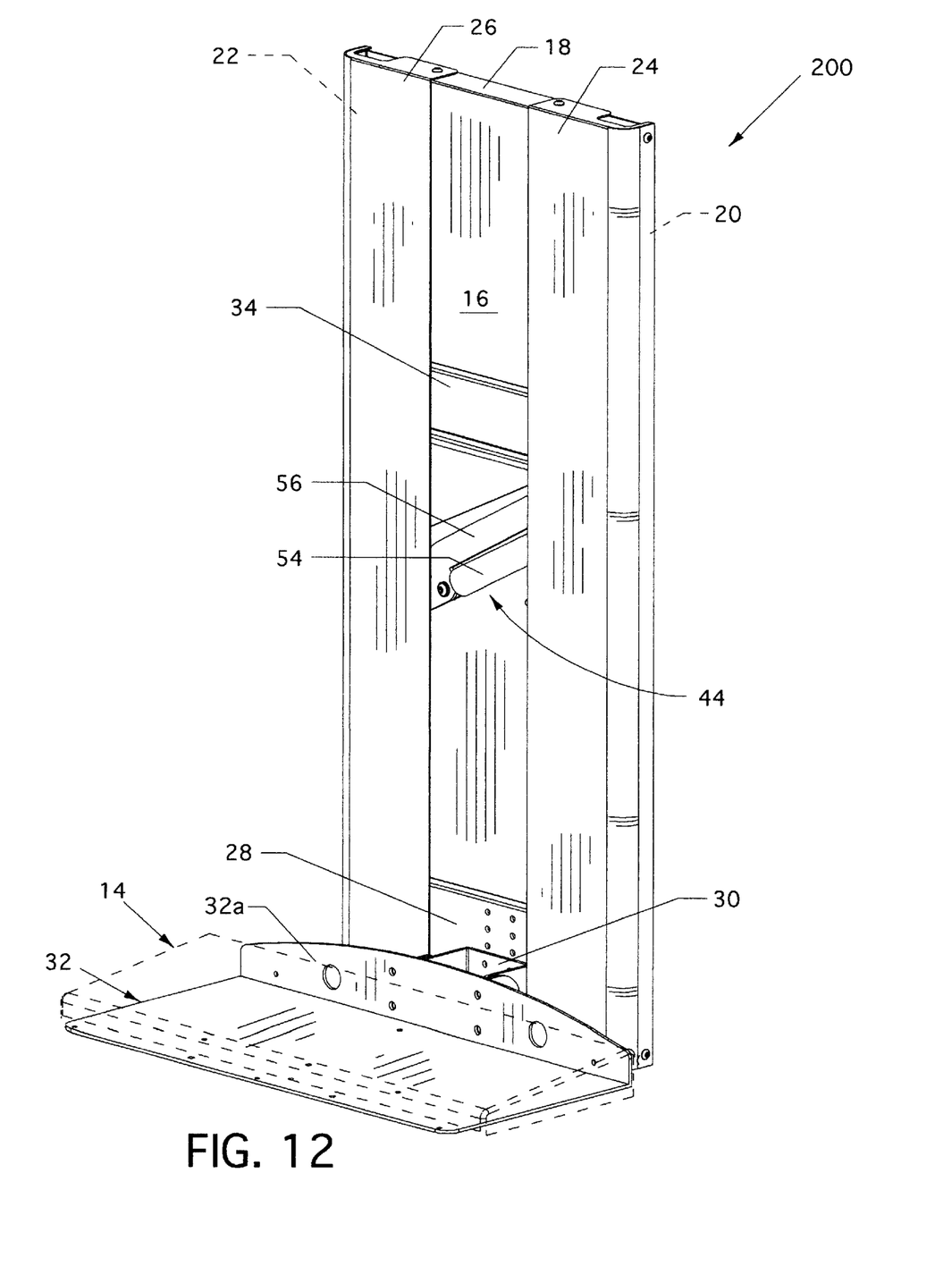

FIG. 12, a second alternative embodiment, illustrates an isometric view of a keyboard lift system 200, where all numerals correspond to those elements previously or otherwise described. The keyboard lift system 200 incorporates the elements previously described for the flat panel monitor/ keyboard lift system 10 with the exception of pivot mount 36 which is required for mounting of a flat panel display. The vertical lift system is utilized where use of a vertically positionable keyboard tray is required without the use of a flat panel display.

LIFT SYSTEM

PARTS LIST

- 10 flat panel monitor/keyboard lift system
- 12 monitor or flat panel display
- 14 keyboard
- 16 planar support panel
- 18 planar top
- 19 planar bottom
- 20 right planar panel side
- 22 left planar panel side
- 24 right cover
- 26 left cover
- 28 keyboard mounting channel
- 28a right tab
- 28b left tab
- 29 hole
- 30 pivot mount
- 32 keyboard tray
- 32a vertical panel
- 34 monitor mounting channel
- 34a right tab
- 34b left tab
- 35a–n hole sets
- 36 pivot mount
- 37 U-shaped bracket
- 37a rear panel
- 37b right panel
- 37c left panel
- 39 transport assembly
- 40 extendable rail
- 42 extendable rail
- 40a extender channel
- 42a extender channel
- 44 linkage assembly
- 46a–n hole sets
- 48a–n hole sets
- 50 angle bracket
- 52 adjuster
- 53 screw
- 54 gas spring
- 55 pivot
- 56 arm
- 56a arm section
- 56b arm section
- 56c arm section
- 56d cam
- 58 pivot assembly
- 60 pivot assembly
- 62 triangular plate
- 62a vertically oriented edge
- 62b angled edge
- 62c bracket
- 64 wear bar
- 66 right pivotable mounting bracket
- 68 left pivotable mounting bracket
- 70 stud
- 72 nut
- 74 spring washer
- 76 UHMW polyethylene washer
- 80 locking mechanism
- 82 U-shaped bracket
- 84 pushrod
- 86 hole
- 88 hole
- 90 cap
- 92 return spring
- 94 pin
- 96 position locking bar
- 96a–n holes
- 100 flat panel monitor lift system
- 200 keyboard lift system Various modifications can be made to the present invention without departing from the apparent scope hereof.

It is claimed:

1. A lift system for raising at least one component from a fully down position to a desired vertically elevated position, comprising:

a. a vertically oriented support panel having a front side, a rear side, and opposite vertical edges;

b. a vertically elevatable transport assembly attached to said front side of said vertically oriented support panel, said vertically elevatable transport assembly being movable from the fully down position to the desired vertically elevated position and including:

(1) first and second spaced apart vertically oriented and vertically movable rails mounted to said front side of said vertically oriented support panel adjacent to respective said opposite vertical edges; and (2) a first mounting member bridging said first and second spaced apart vertically oriented and vertically movable rails and being secured thereto; and, c. means attached to said vertically oriented support panel between said first and second spaced apart vertically oriented and vertically movable rails for providing supported vertical linear motion and positioning of said vertically elevatable transport assembly with respect to said vertically oriented support panel and for maintaining said vertically elevatable transport assembly at the desired vertically elevated position when raised above the fully down position.

2. The lift system as defined in claim 1, wherein said vertically oriented support panel includes first and second vertically oriented channels adjacent to said opposite vertical edges, and wherein said first and second vertically oriented and vertically movable rails are respectively slideably mounted in said first and second vertically oriented channels.

3. The lift system as defined in claim 2, wherein said vertically oriented support panel further includes a first cover covering said first vertically oriented channel and said first vertically oriented and vertically movable rail slideably mounted therein, and a second cover covering said second vertically oriented channel and said second vertically oriented and vertically movable rail slideably mounted therein.

4. The lift system as defined in claim 1, wherein said vertically elevatable transport assembly further includes a pivot mount attached to said mounting member at a position substantially centered between said first and second spaced apart vertically oriented and vertically moveable rails.

5. The lift system as defined in claim 1, wherein said vertically elevatable transport assembly further includes a second mounting member bridging said first and second spaced apart vertically oriented and vertically moveable rails and being secured thereto, said second mounting member being spaced vertically from said first mounting member.

6. The lift system as defined in claim 5, wherein said vertically elevatable transport assembly further includes a pivot mount attached to one of said mounting members at a position substantially centered between said first and second vertically oriented and vertically moveable rails.

7. The lift system as defined in claim 5, wherein said vertically elevatable transport assembly further includes two pivot mounts, one of said two pivot mounts being attached to said first mounting member at a position substantially centered between said first and second vertically oriented and vertically moveable rails, and the other of said two pivot mounts being attached to said second mounting member at a position substantially centered between said first and second vertically oriented and vertically moveable rails.

8. The lift system as defined in claim 1, wherein said vertically elevatable transport assembly further includes an abutment assembly attached to said second vertically oriented and vertically movable rail at a position below said mounting member.

9. The lift system as defined in claim 8, wherein said abutment assembly includes a plate member.

10. The lift system as defined in claim 9, wherein said abutment assembly further includes a wear bar attached to said plate member.

11. The lift system as defined in claim 10, wherein said wear bar is formed of ultra high molecular weight polyethylene.

12. The lift system as defined in claim 1, wherein said means for providing supported vertical linear motion and positioning of said vertically elevatable transport assembly with respect to said vertically oriented support panel and for maintaining said vertically elevatable transport assembly at a desired vertically elevated position when raised above the fully down position comprises a counterbalancing linkage assembly composed of an angle bracket, an adjuster, an arm, and a gas spring.

13. The lift system as defined in claim 12, wherein said adjuster, said arm and said gas spring all lie parallel to said front side of said vertically oriented support panel.

14. The lift system as defined in claim 12, wherein each of said adjuster, said arm, and said gas spring has first and second ends, and wherein said angle bracket is fixed to said vertically oriented support panel at a location closely adjacent to said first vertically oriented and vertically moveable rail, said first end of said adjuster is secured to said angle bracket, said first end of said arm is pivotally connected to said vertically oriented support panel at a connection point located above said angle bracket and closely adjacent to said first vertically oriented and vertically moveable rail, said second end of said adjuster is located below said connection point of said first end of said arm to said vertically oriented support panel and is pivotally connected to said first end of said gas spring, said second end of said gas spring is pivotally connected to said arm at a connection point located between said first and second ends of said arm, and said second end of said arm is positioned closely adjacent to said second vertically oriented and vertically moveable rail.

15. The lift system as defined in claim 14, wherein said adjuster is moveable along said angle bracket and said first end of said adjuster includes an adjuster screw for use in moving said adjuster along said angle bracket to regulate a counterbalance effect provided by said linkage assembly.

16. The lift system as defined in claim 14, wherein said second end of said arm includes a cam.

17. The lift system as defined in claim 16, wherein said vertically elevatable transport assembly further includes an abutment assembly attached to said second vertically oriented and vertically moveable rail, and wherein said cam is engageable with said abutment assembly.

18. The lift system as defined in claim 17, wherein said abutment assembly includes a wear bar against which said cam bears and along which said cam slides during elevation of said vertically elevatable transport assembly.

19. The lift system as defined in claim 1, wherein said vertically elevatable transport assembly further includes a keyboard tray attached to said mounting member.

20. The lift system as defined in claim 19, wherein said keyboard tray is attached to said mounting member by a pivot mount which permits the keyboard tray to pivot from a horizontal use position to a vertical stowed position parallel to said vertically oriented support panel.

21. The lift system as defined in claim 20, wherein said pivot mount includes a locking mechanism for simultaneously locking said keyboard tray in said horizontal use position and said vertically elevatable transport assembly in a vertically elevated position.

22. The lift system as defined in claim 21, wherein said front side of said vertically oriented support panel has mounted thereon a position locking bar having a plurality of vertically spaced holes therein, said mounting member has a hole therethrough selectively alignable with any hole of said plurality of vertically spaced holes in said position locking bar, and said locking mechanism includes a pushrod which is moveable into said hole in said mounting member and an aligned hole in said position locking bar.

23. A lift system for raising a flat panel monitor and a keyboard from a fully down position to a desired vertically elevated position, comprising:
   a. a vertically oriented support panel having a front side, a rear side, and opposite vertical edges; and,
   b. a vertically elevatable transport assembly attached to said front side of said vertically oriented support panel, said vertically elevatable transport assembly being moveable from a fully down position to a desired vertically elevated position and including:
      (1) first and second spaced apart vertically oriented and vertically moveable rails mounted to said front side of said vertically oriented support panel adjacent to respective said opposite vertical edges;
      (2) first and second vertically spaced apart mounting members bridging said first and second vertically oriented and vertically moveable rails and being secured thereto, said first mounting member being located above said second mounting member;
      (3) an abutment assembly fixedly attached to said second vertically oriented and vertically moveable rail at a location between said first and second mounting members;
      (4) a first pivot mount for supporting a flat panel monitor attached to said first mounting member; and,
      (5) a second pivot mount supporting a keyboard tray attached to said second mounting member; and,
   c. a linkage assembly positioned between said first and second vertically oriented and vertically moveable rails and attached to said vertical support panel at a location between said first and second mounting members, said linkage assembly having a fixed end and a moveable end, said fixed end being fixed to said vertically oriented support panel closely adjacent to said first vertically oriented and vertically moveable rail, and said moveable end bearing against said abutment assembly attached to said second vertically oriented and vertically moveable rail.

24. The lift system as defined in claim 23 wherein said keyboard tray is pivotable about said second pivot mount from a horizontal use position to a vertical stowed position parallel to said vertically oriented support panel.

* * * * *